United States Patent
Shibata (10) Patent No.: US 9,885,414 B2
(45) Date of Patent: Feb. 6, 2018

(54) LUBRICATION DEVICE FOR BELT-DRIVEN CONTINUOUSLY VARIABLE TRANSMISSION

(71) Applicant: Toyota Jidosha Kabushiki Kaisha, Toyota-shi (JP)

(72) Inventor: Naoyuki Shibata, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 120 days.

(21) Appl. No.: 14/961,070

(22) Filed: Dec. 7, 2015

(65) Prior Publication Data

US 2016/0201790 A1 Jul. 14, 2016

(30) Foreign Application Priority Data

Jan. 13, 2015 (JP) .................................. 2015-004287

(51) Int. Cl.
*F16H 57/04* (2010.01)
*F16H 9/18* (2006.01)
*F16H 7/18* (2006.01)
*F16H 9/24* (2006.01)

(52) U.S. Cl.
CPC ........... *F16H 57/0456* (2013.01); *F16H 9/18* (2013.01); *F16H 57/0489* (2013.01); *F16H 7/18* (2013.01); *F16H 9/24* (2013.01)

(58) Field of Classification Search
CPC .... F16H 57/0456; F16H 9/18; F16H 57/0489; F16H 7/18; F16H 9/24
See application file for complete search history.

(56) References Cited

U.S. PATENT DOCUMENTS

| 6,435,994 B1 * | 8/2002 | Friedmann | F16H 7/18 474/111 |
| 9,115,806 B2 * | 8/2015 | Nagashima | F16H 61/12 |
| 2004/0082416 A1 * | 4/2004 | Schmidt | F16H 57/0489 474/91 |

(Continued)

FOREIGN PATENT DOCUMENTS

| CN | 101321974 A | 12/2008 |
| CN | 103807418 A | 5/2014 |

(Continued)

OTHER PUBLICATIONS

Combined Office Action and Search Report dated Aug. 31, 2017 in Chinese Patent Application No. 201610020638.5 (with English translation of categories of cited documents).

*Primary Examiner* — William E Dondero
*Assistant Examiner* — Robert T Reese
(74) *Attorney, Agent, or Firm* — Oblon, McClelland, Maier & Neustadt, L.L.P.

(57) ABSTRACT

A lubrication device for a belt-driven continuously variable transmission is provided. The lubrication device comprises a stabilizer 24 brought into contact to a straight portion of a belt 6 between the pulleys to suppress vibrations of the belt. The stabilizer 24 comprises openings 31, 32, 33 and 34 oriented to each contact point between a sheave 7, 8, 13 or 14 and the belt 6 to apply oil thereto, while being allowed to pivot and twist in response to a change in posture of the belt 6 resulting from a speed change operation to keep the opening oriented to the contact point.

14 Claims, 6 Drawing Sheets

(56) References Cited

U.S. PATENT DOCUMENTS

| | | | |
|---|---|---|---|
| 2005/0277500 A1* | 12/2005 | Bitzer | F16H 57/0489 474/1 |
| 2011/0244999 A1* | 10/2011 | Nakamura | F16H 9/18 474/91 |
| 2014/0235390 A1* | 8/2014 | Urbanek | F16H 7/18 474/140 |
| 2015/0176684 A1* | 6/2015 | Werny | F16H 7/18 474/140 |
| 2016/0040762 A1* | 2/2016 | Garcia | F16H 7/18 474/140 |

FOREIGN PATENT DOCUMENTS

| | | |
|---|---|---|
| EP | 1 957 835 B1 | 6/2011 |
| JP | 2009-517616 A | 4/2009 |
| JP | 2014-5873 | 1/2014 |
| JP | 2014-13068 | 1/2014 |
| JP | 2014-95440 A | 5/2014 |
| WO | WO 2007/064190 A1 | 6/2007 |

\* cited by examiner

LUBRICATION DEVICE FOR BELT-DRIVEN CONTINUOUSLY VARIABLE TRANSMISSION

The present invention claims the benefit of Japanese Patent Applications No. 2015-004287 filed on Jan. 13, 2015 with the Japanese Patent Office, the disclosures of which are incorporated herein by reference in its entirety.

BACKGROUND

Field of the Invention

The present invention relates to a belt-driven continuously variable transmission having a pair of pulleys and a belt running between the pulleys, and more particularly, to a lubrication device for lubricating a contact point between the pulley and the belt.

Discussion of the Related Art

JP-A-2014-5873 describes a lubrication device for continuously variable transmissions adapted to apply lubricant to an inner circumferential region of a conical face. According to the teachings of JP-A-2014-5873, the lubrication device is provided with a stabilizer adapted to suppress vibrations of the belt by a pair of plate members. The stabilizer is allowed to tilt around a support shaft in accordance with a speed ratio. The support shaft has a first outlet opening toward a conical face of one of the pulleys, a second outlet opening toward a conical face of the other pulley, and a hollow portion providing a connection between those outlets. In the continuously variable transmission taught by JP-A-2014-5873, a running diameter of the belt in one of the pulleys is reduced by expanding a running diameter of the belt in the other pulley. Consequently, the stabilizer is tilted so that the one of outlets opening toward the pulley in which the running diameter of the belt is expanded is closed to deliver larger amount of the oil to the other pulley in which the running diameter of the belt is reduced.

JP-A-2014-13068 also describes a lubrication device for continuously transmissions. According to the teachings of JP-A-2014-13068, the lubrication device is adapted to deliver oil to a primary shaft and a secondary shaft from a feeding conduit extends between a primary pulley and a secondary pulley. The lubrication device taught by JP-A-2014-13068 is provided with a guide member for guiding the oil discharged from the feeding conduit toward a belt groove of the pulley.

Thus, the lubrication devices taught by JP-A-2014-5873 and JP-A-2014-13068 are adapted to deliver the oil to the conical face of the pulley in which a running radius of the belt is reduced. However, in the belt-driven continuously variable transmission, running diameters of the belt are varied continuously in accordance with a speed ratio. That is, according to the teachings of the above-mentioned prior art documents, the oil may not be applied directly to a contact point between the belt and the pulley depending on the speed ratio. Consequently, the pulley or belt may be damaged due to lack of lubricant. In addition, the oil delivered to the conical face of the pulley may be scattered centrifugally and hence oil consumption would be increased.

The present invention has been conceived noting the foregoing technical problems, and it is therefore an object of the present invention is to provide a lubrication device for a belt-driven continuously variable transmission that can apply oil sufficiently to a contact point between a pulley and a belt irrespective of speed ratio.

SUMMARY OF THE INVENTION

The lubrication device according to the preferred example is applied to a belt-driven continuously variable transmission having a pair of pulleys and a belt running between the pulleys to transmit torque therebetween. Each pulley is individually provided with a fixed sheave integrated with a rotary shaft, and a movable sheave fitted onto the rotary shaft while being allowed to rotate integrally therewith and to reciprocate thereon. In order to achieve the above-explained objective, according to the preferred example, the lubrication device is provided with a stabilizer that is brought into contact to a straight portion of the belt between the pulleys to suppress vibrations of the belt. The stabilizer is provided with an opening oriented to a contact point between the belt and the sheave to apply oil to the contact point, and allowed to pivot and twist in response to a change in posture of the belt resulting from a speed change operation to keep the opening oriented to the contact point.

The opening may include a first opening oriented to a conical face of the fixed sheave to apply oil thereto, and a second opening oriented to a conical face of the movable sheave to apply oil thereto.

The opening may be formed on both ends of the stabilizer in a running direction of the belt. One of the openings oriented to the contact point between the sheave and the belt entering into the pulley is diametrically larger than the other opening of opposite side.

The lubrication device is further provided with a controller that controls a discharge amount of the oil from the opening. Specifically, the belt is a chain belt comprising a plurality of oval plate links arranged alternately to one another in a circular manner, and a plurality of pins individually inserted into each pin hole of the link to connect the adjoining links while allowing to pivot therearound. Specifically, the controller may be configured to reduce the discharge amount of the oil from the opening with an increase in a slippage between the belt and the pulley.

The lubrication device is further provided with an oil passage connected to the opening, and the controller may be further configured to reduce an oil delivery amount to the oil passage with an increase in a slippage between the belt and the pulley.

The oil passage includes a tube having said opening on its leading end, and the tube is allowed to slide on the stabilizer in the running direction of the belt.

The oil passage further includes a feeding passage providing a connection between a hydraulic source and the tube, and one of leading ends of the feeding pipe may be connected flexibly to the tube.

The other leading end of the feeding pipe may be connected to a casing while being allowed to rotate.

The stabilizer is further provided with a pair of plate members being opposed to each other individually brought into contact to the belt running therebetween to suppress vibrations of the belt.

Thus, the stabilizer according to the preferred example is brought into contact to the straight portion of the belt between the pulleys to suppress vibrations of the belt. In addition, the opening of the stabilizer is oriented to the contact point between the belt and the pulley while being allowed to pivot and twist in response to a change in posture of the belt resulting from a speed change operation. According to the preferred example, therefore, the opening can be kept to be oriented to the contact point between the belt and the pulley to apply oil thereto even if the contact point is displaced as a result of the speed change operation. For this reason, the contact point between the belt and the pulley can be lubricated sufficiently irrespective of the current speed ratio.

In addition, an oil delivery amount to the contact point between the belt and the pulley can be reduced with an increase in a slippage between the belt and the pulley. According to the preferred example, therefore, oil will not be applied excessively to the contact point so that slippage of belt in the pulley can be avoided to improve transmitting efficiency of the continuously variable transmission.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 8:
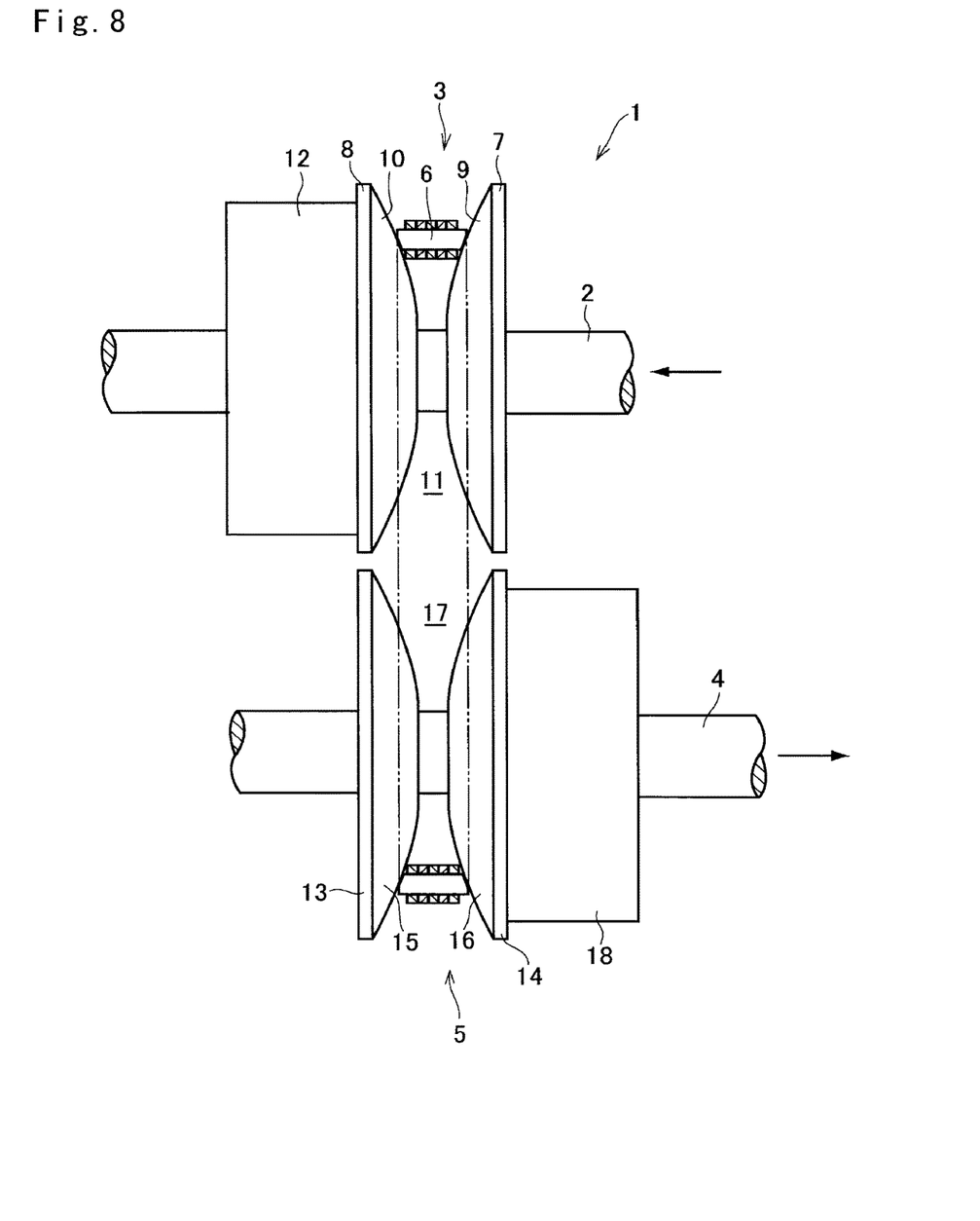
FIG. 8 is a schematic illustration showing an example of the belt-driven continuously variable transmission.

The belt-driven continuously variable transmission to which the lubrication device of the preferred example is applied comprises a pair of pulleys and a belt running between those pulleys. A structure of the belt-driven continuously variable transmission will be explained in more detail with reference to FIG. 8. As illustrated in FIG. 8, the belt-driven continuously variable transmission (to be abbreviated as the "CVT" hereinafter) 1 comprises an input shaft 2 to which a torque is delivered from a prime mover such as an engine, a primary pulley fitted onto the input shaft 2, an output shaft 4 that delivers a torque to an output member such a driving wheels, a secondary pulley 5 fitted onto the output shaft 5, and an endless belt 6 running between the pulleys 3 and 5. The input shaft 2 and the output shaft 4 are arranged parallel to each other.

The primary pulley 3 comprises a first fixed sheave 7 formed integrally with the input shaft 2, and a first movable sheave 8 fitted onto the input shaft 2 while being allowed to reciprocate thereon. Specifically, the first movable sheave 8 is splined onto the input shaft 2 in such a manner to rotate integrally with the input shaft 2 while being allowed to move closer to and away from the first fixed sheave 7. A conical face 9 of the first fixed sheave 7 and a conical face 10 of the first movable sheave 8 are opposed to each other so that a first belt groove 11 is formed therebetween.

A first hydraulic actuator 12 is arranged on a back face of the first movable sheave 8 opposite to the conical face 10 so that the first movable sheave 8 is pushed toward the first fixed sheave 7 by delivering oil to the first hydraulic actuator 12.

A structure of the secondary pulley 5 is similar to that of the primary pulley 3. As also illustrated in FIG. 8, the secondary pulley 5 comprises a second fixed sheave 13 formed integrally with the output shaft 4, and a second movable sheave 14 fitted onto the output shaft 4 while being allowed to reciprocate thereon. The second movable sheave 14 is also splined onto the output shaft 4 in such a manner to rotate integrally with the output shaft 4 while being allowed to move closer to and away from the second fixed sheave 13. A conical face 15 of the second fixed sheave 13 and a conical face 16 of the second movable sheave 14 are opposed to each other so that a second belt groove 17 is formed therebetween.

Likewise, a second hydraulic actuator 12 is arranged on a back face of the second movable sheave 14 opposite to the conical face 16 so that the second movable sheave 14 is pushed toward the second fixed sheave 13 by delivering oil to the second hydraulic actuator 18. Thus, the first fixed sheave 7 and the second fixed sheave 13 are arranged diagonally, and the first movable sheave 8 and the second movable sheave 14 are arranged diagonally. The belt 6 is held in the first belt groove 11 and the second belt groove 17 in such a manner that one of lateral faces is brought into contact to the conical faces 9 and 16, and the other lateral face is brought into contact to the conical faces 10 and 15.

Figure 9:
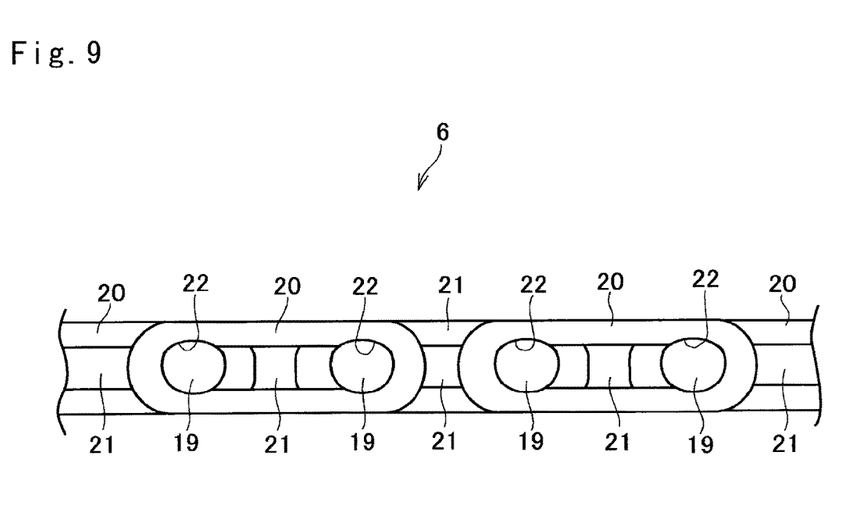
FIG. 9 is an enlarged view showing one example of a structure of a chain belt.

Turning to FIG. 9, there is shown a structure of the belt 6 thus applied to the primary pulley 3 and the secondary pulley 5. The belt 6 comprises a plurality of links 20 and a plurality of pins 19. The link 20 is an oval plate member having a space 21, and a pair of pin holders 22 on both corners. An inner diameter of the pin holder 22 is substantially identical to an outer diameter of the pin 19 to hold the pin 19 therein, and an opening width of the space 21 is narrower than the outer diameter of the pin 19 to avoid longitudinal displacement of the pin 19.

The links 20 are arranged alternately to one another to form a circular layer, and a plurality of the circular layers of the links 20 are overlapped to one another in such a manner that pin holders 22 of inner and outer links 20 on each corner of the space 21 are individually joined to form a row of pin holes on each corner of the space 21. The pin 19 is individually inserted into each row of pin holes so that the layers of links 20 are pinned together while allowing each link 20 to pivot around the pin 19. In the belt 6 thus structured, each width end face of the pin 19 protrudes slightly from the outermost layer of the link 20 to serve as a power transmission face.

The pin 19 may have not only a true circle cross-sectional shape but an oval cross-sectional shape as well. In addition, in order to enhance strength of the belt 6, a plurality of pins 19 may be inserted into the pin hole. In this case, specifically, a pair of pins 19 whose cross-sectional shape is oval are inserted into the pin hole in such a manner that curved contact faces thereof are brought into contact to each other so that a sliding resistance between the contact faces of the pins 19 can be reduced in comparison with that between the pin 19 and the link 20 pivoting therearound.

Alternatively, a pair of completed pin holes may also be formed in the link 20 instead of the space 21 and the pin holders 22. In addition, a push belt formed by fastening a plurality of elements juxtaposed in a circular manner may also be used as the belt 6 instead of the chain belt thus structured.

A speed ratio of the CVT 1 is varied by changing widths of the first belt groove 11 and the second belt groove 17. Specifically, a speed ratio of the CVT 1 is varied by changing a delivery amount of the oil to the first hydraulic actuator 12 to change a width of the first belt groove 11 in accordance with a required engine speed. Since the belt 6 has a sufficient tensile strength not to be elongated during the speed change operation, a width of the second belt groove 17 is changed in response to a change in the width of the first belt groove 11.

In the CVT 1, torque is transmitted frictionally between each conical face 9, 10, 15 and 16 of the primary pulley 3 and the secondary pulley 5, and each width end face of the pin 19 of the belt 6. Thus, width end faces of each pin 16 serve as power transmission faces. The friction acting between the width end face of the pin 19 and the conical face 9, 10, 15 or 16 is varied in response to a change in the hydraulic pressure delivered to the second hydraulic actuator 18 to achieve a required driving force.

In the belt 6 held in the first belt groove 11 and the second belt groove 17, the pins 19 are juxtaposed at constant intervals. During transmitting torque between the primary pulley 3 and the secondary pulley 5, the pins 19 are intermittently pulled into and withdrawn from the belt grooves 11 and 17. Consequently, stresses acting on the primary pulley 3 and the secondary pulley 5, and the pins 19 are varied intermittently. For this reason, straight portions 23 of the belt 6 between the primary pulley 3 and the secondary pulley 5 are vibrated. Given that the above-mentioned push belt is used instead of the belt 6, the push belt 6 would be vibrated with different frequency and amplitude.

Figure 1:
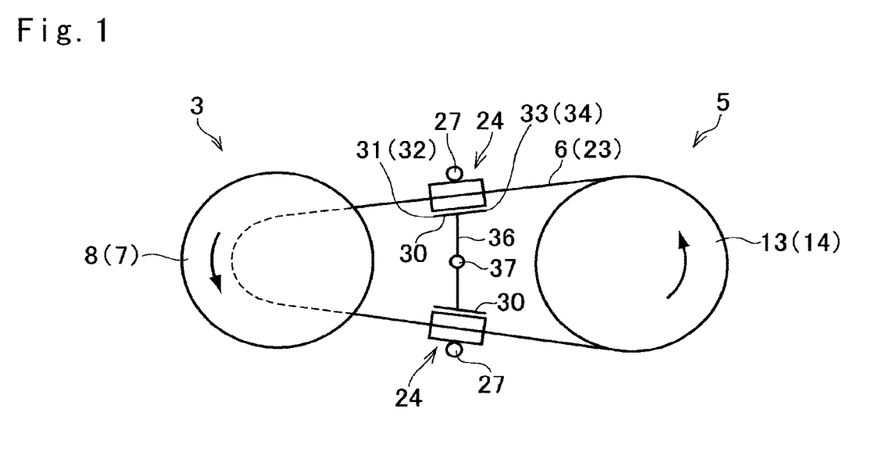
FIG. 1 is a schematic illustration showing the stabilizer according to the preferred example.

In order to suppress such vibration of the belt 6, a stabilizer 24 made of resin is disposed on an intermediate point of the straight portion 23 of the belt 6. Specifically, as shown in FIG. 1, the stabilizer 24 is individually disposed on the intermediate point of the straight portion 23 of the belt 6 running from the primary pulley 3 toward the secondary pulley 5, and the intermediate point of the straight portion 23 of the belt 6 running from the secondary pulley 5 toward the primary pulley 3. Structures of those stabilizers 24 are similar to each other, and hence the structure of the stabilizer 24 disposed on the straight portion 23 of the belt 6 running from the secondary pulley 5 toward the primary pulley 3 (i.e., the upper stabilizer 24 in FIG. 1) will be explained hereinafter.

Figure 2:
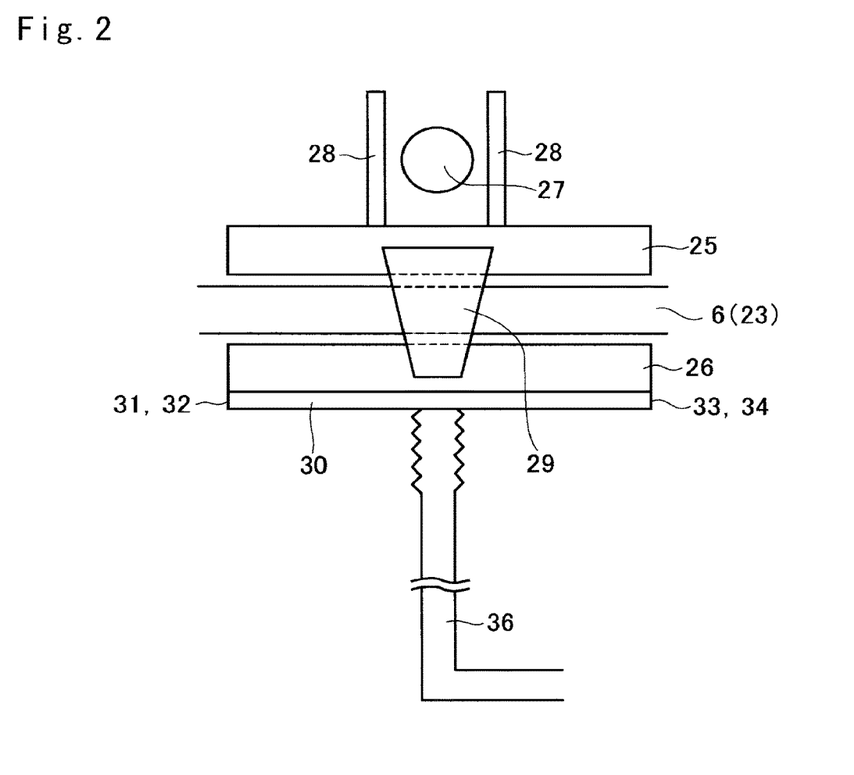
FIG. 2 is a side view of the stabilizer and a feeding pipe.

Turning to FIG. 2, there is shown a structure of the stabilizer 24 according to the preferred example. The stabilizer 24 is brought into contact to both inner and outer circumferential faces of the straight portion 23 of the belt 6 to suppress vibrations of the belt 6. To this end, the stabilizer 24 is provided with a first plate member 25 being opposed to the inner outer circumferential face of the belt 6, and a second plate member 26 being opposed to the inner outer circumferential face of the belt 6.

The stabilizer 24 is allowed to pivot around a support shaft 27 attached to a not shown casing. Specifically, a pair of stopper portions 28 is erected on the first plate member 25 on both sides of the support shaft 27 so that the stabilizer 24 can pivot around the support shaft 27 in response to a change in an inclination of the straight portion 23 of the belt 6. In order to allow the stabilizer 24 to also twist around the support shaft 27 in response to lateral movement of the belt 6 resulting from a change in the width of the belt groove 11 or 17, a slight clearance is maintained between the support shaft 27 and each stopper 28. The first plate member 25 and the second plate member 26 are connected to each other through a side plate 29 attached to lateral faces thereof.

Thus, the stabilizer 24 is adapted to pivot and twist in response to a movement of the belt 6. As described, in the CVT 1, effective diameters of the belt 6 in the first belt groove 11 of the primary pulley 3 and in the second belt groove 17 of the secondary pulley are varied to achieve a required speed ratio. Consequently, an inclination of the straight portion of the belt 6 is changed in response to a change in the speed ratio, and the outer or inner circumferential face of the belt 6 comes into contact to the first plate member 25 or the second plate member 26 to pivot the stabilizer 24 around the support shaft 27.

In addition, the belt 6 is also displaced obliquely with respect to the running direction as a result of being pushed laterally by the conical face 10 of the first movable sheave 8 and the conical face 16 of the second movable sheave 14 to achieve a required speed ratio. Consequently, one of the lateral faces of the belt 6 is brought into contact to the side plate 29 so that the stabilizer 24 is twisted around the support shaft 27. As described, a clearance between the stopper members 28 is kept wider than an outer diameter of the support shaft 27 so that one of the first plate member 25 and the second plate member 26 is always brought into contact to the belt 6. In this situation, therefore, an orientation of the stabilizer 24 is also changed by a friction acting between the belt 6 and the first plate member 25 or the second plate member 26. According to the preferred example, therefore, each opening of the stabilizer 24 between the first plate member 25 and the second plate member 26 is oriented individually to each contact point between the belt 6 and the belt groove 11 and 17 in each of the primary pulley 3 and the secondary pulley 5.

Figure 3:
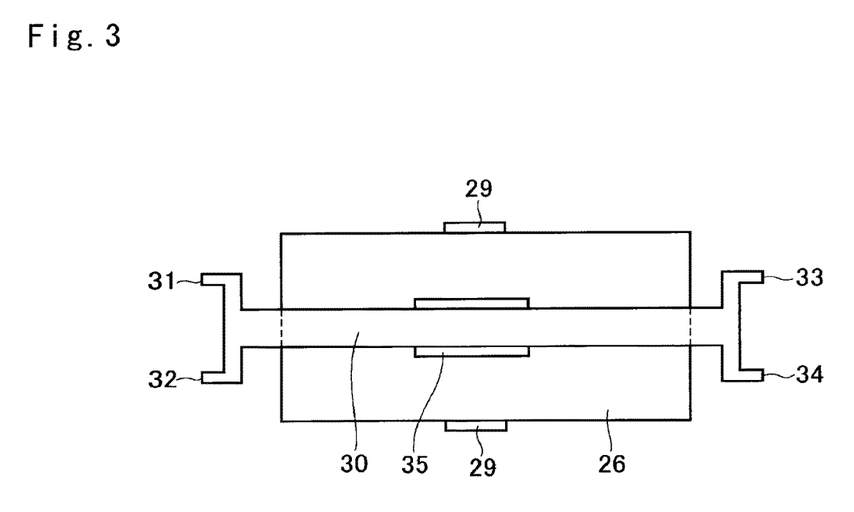
FIG. 3 is a schematic illustration showing a tube arranged on a second plate member of the stabilizer.

Specifically, as a result of such changes in the inclination and traveling direction of the belt 6, one of the openings of the (upper) stabilizer 24 is oriented to a point at which the belt 6 is pulled out of the second belt groove 17 of the secondary pulley 5, and the other opening of the stabilizer 24 is oriented to a point at which the belt 6 is pushed into the first belt groove 11 of the primary pulley 3. As illustrated in FIG. 3, in order to apply oil to the contact points between the belt 6 and the belt grooves 11 and 17, a tube 30 is arranged on a face of the second plate member 26 of an inner circumferential side of the belt 6 (to be called the "inner face" hereinafter). As shown in FIG. 3, each leading end of the tube 30 has two outlets to apply oil to each contact point between the belt 6 and the belt grooves. In the tube 30, specifically, a first opening 31 is oriented to the contact point between one of the lateral faces of the belt 6 and the conical face 9 of the primary pulley 3, and a second opening 32 is oriented to the contact point between the other the lateral face of the belt 6 and the conical face 10 of the primary pulley 3. Likewise, a third opening 33 is oriented to the contact point between one of the lateral faces of the belt 6 and the conical face 16 of the secondary pulley 5, and a fourth opening 34 is oriented to the contact point between the other the lateral face of the belt 6 and the conical face 15 of the secondary pulley 5. In addition, a clearance between the first opening 31 and the second opening 32, and a clearance between the third opening 33 and the fourth opening 34 are identical to each other.

During propulsion of the vehicle in the forward direction, a load acting between the first belt groove 11 of the primary pulley 3 and the belt 6 entering into the first belt groove 11 is larger than that acting between the second belt groove 17 of the secondary pulley 5 and the belt 6 getting out of the second belt groove 17. In order to deliver sufficient amount of the oil to the first belt groove 11 of the primary pulley 3, the first opening 31 and the second opening 32 are formed in such a manner to have larger opening areas than those of the third opening 33 and the fourth opening 34.

In addition, the tube 30 is allowed to slide longitudinally on the second plate member 26. To this end, a rail 35 having a predetermine length is formed on the lower face of the second plate member 26, and an intermediate portion of the tube 30 is mounted on the rail 35.

As illustrated in FIGS. 1 and 2, in order to deliver oil to the tube 30, a feeding pipe 36 extends from a casing 37 while being bent toward the stabilizer 24 to be connected to the intermediate portion of the tube 30. In order to ensure flexibility of a connection between the tube 30 and the feeding pipe 36, a leading end of the feeding pipe 36 is formed into accordion.

Figure 4:
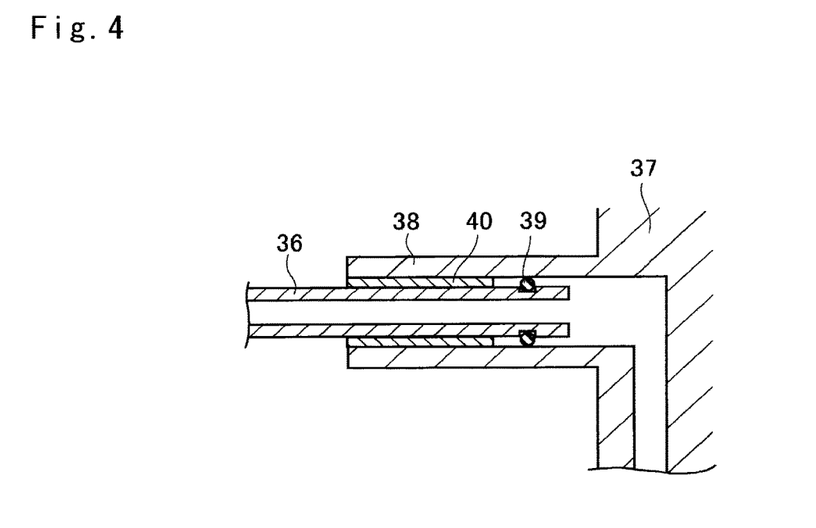
FIG. 4 is a cross-sectional view of a connection between the feeding pipe and a casing.

Turning to FIG. 4, there is shown a connection between the feeding pipe 36 and the casing 37 in more detail. As illustrated in FIG. 4, a cylinder 38 protrudes inwardly from an inner face of the casing 37. One of the leading ends of the feeding pipe 36 is inserted into the cylinder 38, and a sealing member 39 such as an O-ring is interposed between an outer circumferential face of the feeding pipe 36 and an inner circumferential face of the cylinder 38. In addition, in order to allow the feeding pipe 36 to slide in the longitudinal direction and to rotate in the cylinder 38, a slide bearing 40 is also interposed between the outer circumferential face of the feeding pipe 36 and the inner circumferential face of the cylinder 38 in the vicinity of an opening of the cylinder 38. As described later, oil is delivered to the cylinder 38 from a hydraulic source such as an oil pump.

A distance between a longitudinal center point of the stabilizer 24 and the cylinder 38 is changed by an oscillating motion of the stabilizer 24 around the support shaft 27. However, the leading end of the feeding pipe 36 connected to the tube 30 is formed into accordion, and the tube 30 is allowed to slide on the second plate member 26 of the stabilizer 24. For these reasons, detachment of the feeding pipe 36 from the tube 30 can be prevented so that oil can be delivered stably to the tube 30 irrespective of oscillation of the stabilizer 24.

The pipe 36 is also twisted by a twisting motion of the stabilizer 24. However, the leading end of the feeding pipe 36 inserted into the cylinder 38 of the casing 37 is allowed by the slide bearing 40 to rotate within the cylinder 38. For this reason, oil can be delivered stably to the tube 30 even if the pipe 36 is twisted by a twisting motion of the stabilizer 24.

If the belt 6 is displaced in the lateral direction significantly by the twisting motion of the stabilizer 24, the tube 30 may be displaced along the support shaft 27. However, the leading end of the feeding pipe 36 inserted into the cylinder 38 of the casing 37 is also allowed by the slide bearing 40 to reciprocate within the cylinder 38. For this reason, oil can be delivered stably to the tube 30 even if the pipe 36 is twisted significantly by a twisting motion of the stabilizer 24.

Thus, the stabilizer 24 is allowed to pivot and twist around the support shaft 27 so that each opening of the stabilizer 24 can be individually oriented to each contact point between the belt 6 and the belt groove 11 and 17. In addition, since one of the leading ends of the feeding pipe 36 is connected to the tube 30 through the accordion and the other leading end of the feeding pipe 36 is connected to the cylinder 38 through the slide bearing 40, the oil can be delivered stably to the stabilizer 24 through the feeding pipe 36. For this reason, oil can be applied accurately to each contact point between the lateral face of the belt 6 and the conical face 9, 10, 15 and 16 irrespective of execution of a speed change operation of the CVT 1. Further, since the first opening 31 and the second opening 32 are larger than the third opening 33 and the fourth opening 34, shortage of the oil in the first belt groove 11 of the primary pulley 3 to which the belt 6 enters can be prevented while preventing excessive oil supply to the second belt groove 17 of the secondary pulley 5 from which the belt 6 is withdrawn.

A friction coefficient between the width end face of pin 19 of the belt 6 and the conical face 9, 10, 15 or 16 is decreased with the wear of the conical face 9, 10, 15 or 16. That is, a slippage at the contact point between the width end face of the pin 19 of the belt 6 and the conical face 9, 10, 15 or 16 is increased with an increase in the total travel distance of the vehicle. Such slippage $\Delta N$ can be calculated based on a difference between: a reference output speed Nt as a product of an input speed to the CVT 1 and a speed ratio under the condition that the slippage does not occur; and an actual output speed Na. A decreasing rate of the output speed, that is, a slip rate can be calculated by dividing the actual slippage $\Delta N$ by the reference output speed Nt ($\Delta N/Nt$).

However, the slippage between the lateral face of the pin 19 of the belt 6 and the conical face 9, 10, 15 or 16 may occur inevitably even in an initial condition of the CVT 1 in which the conical face 9, 10, 15 or 16 has not yet been worn out and a total travel distance is still small. As can be seen from FIG. 5, the slip rate starts increasing from the initial slip rate Ss at which the total travel distance of the vehicle is zero, and the slip rate increases with an increase in the total travel distance.

As described, a friction coefficient of the case in which the conical face 9, 10, 15 or 16 is worn out is smaller than that of the case in which the conical face 9, 10, 15 or 16 has not yet been worn out. That is, the slippage between the pin 19 and the conical face 9, 10, 15 or 16 would be increased in the initial condition of the CVT 1 in which the conical face 9, 10, 15 or 16 has not yet been worn out, if the oil is applied to the contact point therebetween in the same amount as the case in which the conical face 9, 10, 15 or 16 is worn out. In order to prevent such disadvantage, according to the preferred example, oil delivery amounts from the openings 31, 32, 33 and 34 to the contact points between the pin 19 and the conical faces 9, 10, 15 and 16 are adjusted by controlling a feeding amount of the oil to the tube 30 in accordance with the slippage.

Figure 6:
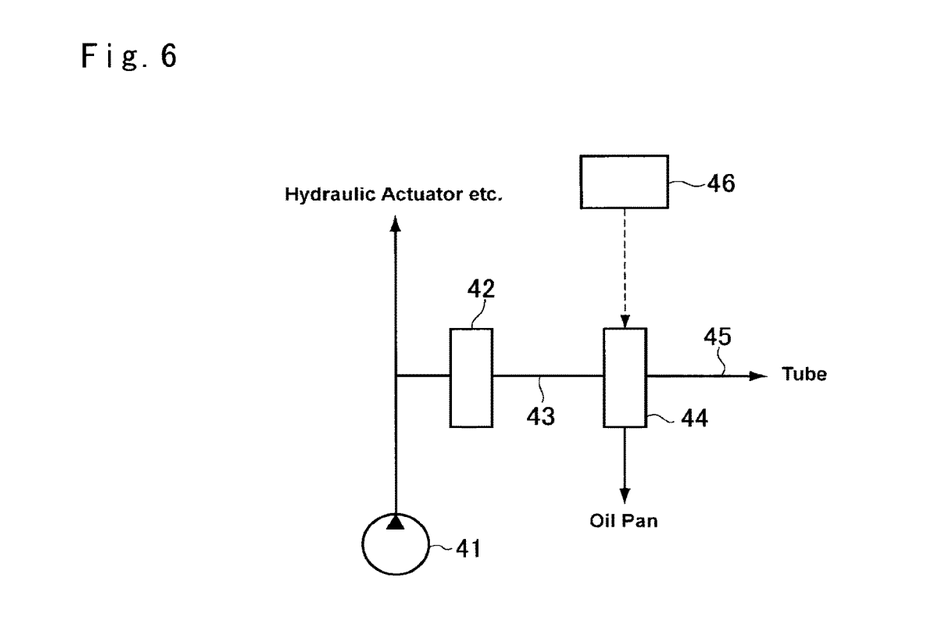
FIG. 6 is a hydraulic circuit for delivering oil to the tube.

Here will be explained a hydraulic circuit for delivering the oil to the tube 30 with reference to FIG. 6. In the hydraulic circuit shown in FIG. 6, not only a mechanical pump driven by an engine torque but also an electric pump activated by the motor can be used as an oil pump 41 to pump up the oil from an oil pan. A pressure of the oil discharged from the oil pump 41 is regulated to a predetermined level by a regulator valve 42 disposed on a passage 43. Specifically, the regulator valve 42 is adapted to regulate a pressure of the oil discharged from the oil pump 41 to a predetermined pressure determined based e.g., on an opening degree of the accelerator by discharging excess oil therefrom. The oil thus regulated by the regulator valve 42 is delivered to the first hydraulic actuator 12 and the second hydraulic actuator 18, and the remaining oil discharged from the regulator valve 42 is used for the purpose of lubrication and cooling.

In order to adjust a flow rate of the oil flowing from the regulator valve 42, an on-off valve 44 activated electromagnetically is also disposed on the passage 43. Specifically, the on-off valve 44 is also adapted to drain excess oil therefrom to the oil pan. The remaining oil is further delivered to the openings 31, 32, 33 and 34 through another passage 45 and the feeding pipe 36 in the amount adjusted by the on-off valve 44, and discharged from each opening 31, 32, 33 and 34 in the amounts determined by the opening areas of those openings.

To this end, the on-off valve 44 is controlled by an electronic control unit (to be abbreviated as the "ECU" hereinafter) 46 serving as the claimed controller. The ECU 46 is configured to carry out a calculation based on incident signals representing speeds of the engine, the input shaft 2 and the output shaft 4, a required driving force based on an opening degree of the accelerator, and hydraulic pressures in the actuators 12 and 18, while with reference to preinstalled map etc. Based on calculation results, the ECU 46 transmits command signals to solenoid valves controlling the oil delivered to the hydraulic actuators 12 and 18, the regulator valve 42, the on-off valve 44 and so on.

An example of controlling an oil delivery amount to the tube 30 in accordance with a slippage between the belt 6 and the conical face 9, 10, 15 or 16 will be explained with reference to FIG. 7. According to the example shown in FIG. 7, specifically, the oil delivery amount to the tube 30 is controlled based on the above-mentioned slip rate. Instead, the oil delivery amount to the tube 30 may also be controlled based on a difference between a slippage of the case in which the conical face 9, 10, 15 or 16 is not worn out and a current slippage, or based on an output speed.

Figure 5:
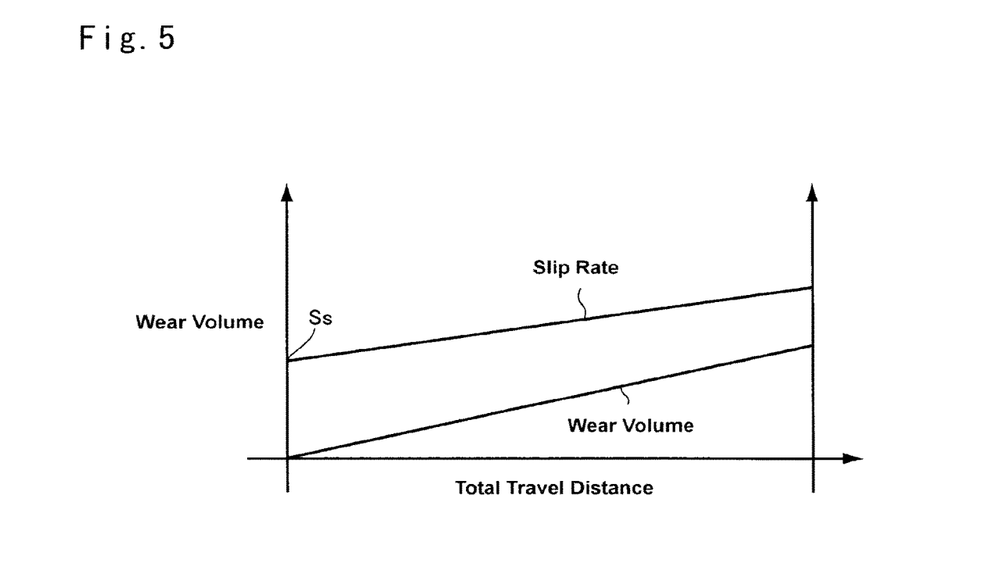
FIG. 5 is a graph indicating a relation among a wear volume, a total travel distance, and a slip rate.
Figure 7:
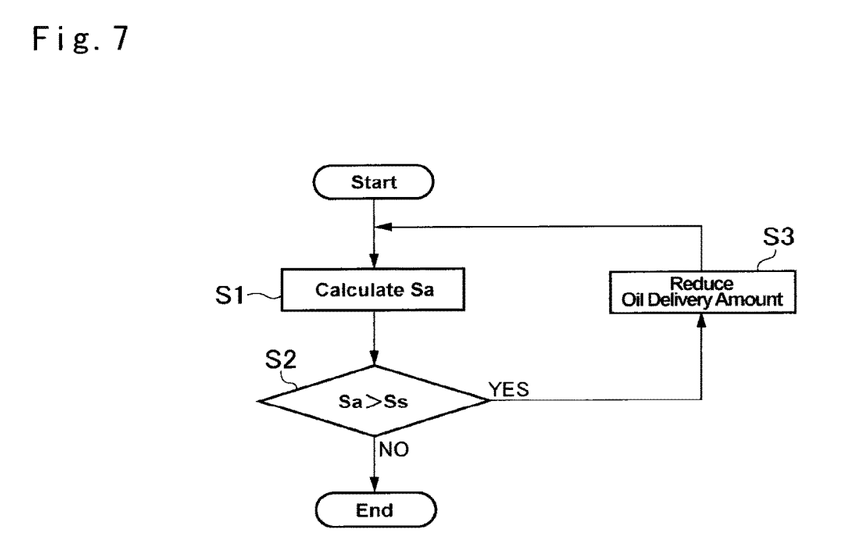
FIG. 7 is a flowchart showing an example of adjusting an oil delivery amount to the tube.

As indicated in FIG. 5, the slip rate is increased with an increase in the total travel distance, and hence the control shown in FIG. 7 is executed at every predetermined distance. To this end, a travel distance at which the slip rate is changed to an extent that behavior and power transmission efficiency are changed significantly is determined based on an experimentation, and the routine shown in FIG. 7 is repeated at every travel distance thus determined.

According to the example shown in FIG. 7, a current slip rate Sa is calculated at step S1 based on the above-explained actual slippage ΔN and the reference output speed Nt. Then, at step S2, the slip rate Sa calculated at step S1 is compared to the initial slip rate Ss. The initial slip rate Ss may be determined by measuring an actual slippage of the new CVT 1 just assembled, and the initial slip rate Ss thus measured is stored in the ECU 46. Alternatively, the initial slip rate Ss may also be calculated based on an input speed, an input torque, a speed ratio, and a designed friction coefficient between the pin 19 and the conical face 9, 10, 15 or 16. At step S2, optionally, the slip rate Sa may by compared to the initial slip rate Ss while taking account of a measurement error of the speed of the output shaft 4.

If the current slip rate Sa is larger than the initial slip rate Ss so that the answer of step S2 is YES, an oil discharge amount from the tube 30 is reduced at step S3. To this end, for example, an oil delivery amount to the tube 30 is reduced by changing a current applied to the on-off valve 44 in such a manner to reduce an oil discharging amount of the on-off valve 44. At step S3, specifically, a reduction amount of the oil delivered to the tube 30 may be determined based on a predetermined value. Alternatively, the reduction amount of the oil delivered to the tube 30 may also be determined based on a difference between the slip rate Sa calculated at step S1 and the initial slip rate Ss. Then, the routine is returned to step S1.

By contrast, if the current slip rate Sa is not increased from the initial slip rate Ss so that the answer of step S2 is NO, this means that the conical face 9, 10, 15 or 16 has not yet been worn out and hence the oil discharge amount from the tube 30 will not be changed. Then, the routine is ended.

Thus, according to the control example shown in FIG. 7, the oil discharge amount from the tube 30 is changed in response to an increase in a wear volume in such a manner that the slip rate can be maintained to the initial slip rate Ss. According to the preferred example, therefore, oil will not be delivered excessively to each contact point between the pin 19 of the belt 6 and the conical face 9, 10, 15 and 16 after reduction in the friction coefficient therebetween to maintain torque transmitting efficiency of the CVT 1. In addition, since the slippage between the pin 19 of the belt 6 and the conical face 9, 10, 15 or 16 can be reduced without increasing a belt clamping pressure, the belt 6 can be prevented from being damaged. Further, since the oil discharging amount of the oil pump 41 can be reduced, a power loss resulting from activating the oil pump 41 may also be reduced.

The oil delivery amount to the tube 30 may also be controlled by changing a current value applied to an electric oil pump for delivering oil to the tube 30. Optionally, a variable throttle may also be disposed on the feeding pipe 36 to control the oil delivery amount to the tube 30. In addition, the above-explained support shaft 27 may also be arranged on an inner side of the belt 6. In this case, the stoppers 28 may be formed on the second plate member 26. Further, the tube 30 may also be held in a groove formed on the second plate member 26 while being allowed to slide longitudinally.

What is claimed is:

1. A lubrication device for a belt-driven continuously variable transmission having a pair of pulleys each of which is formed by a fixed sheave integrated with a rotary shaft and a movable sheave fitted onto the rotary shaft while being allowed to rotate integrally therewith and to reciprocate thereon, and a belt running between the pulleys to transmit torque therebetween, comprising:

a stabilizer that is brought into contact to a straight portion of the belt between the pulleys to suppress vibrations of the belt;

wherein the stabilizer comprises an opening oriented to a contact point between the sheave and the belt to apply oil to the contact point;

wherein the stabilizer is allowed to pivot and twist in response to a change in posture of the belt resulting from a speed change operation to keep the opening oriented to the contact point, and wherein the opening includes a first opening oriented to a conical face of the fixed sheave to apply oil thereto and a second opening oriented to a conical face of the movable sheave to apply oil thereto.

2. The lubrication device for a belt-driven continuously variable transmission as claimed in claim 1, further comprising:

a controller that controls a discharge amount of the oil from the opening;

wherein the belt includes a chain belt comprising a plurality of oval plate links arranged alternately to one another in a circular manner, and a plurality of pins individually inserted into each pin hole of the link to connect the adjoining links while allowing to pivot therearound; and wherein the controller is configured to reduce the discharge amount of the oil from the opening with an increase in a slippage between the belt and the pulley.

3. The lubrication device for a belt-driven continuously variable transmission as claimed in claim 2, further comprising:

an oil passage connected to the opening; and wherein the controller is further configured to reduce an oil delivery amount to the oil passage with an increase in a slippage between the belt and the pulley.

4. The lubrication device for a belt-driven continuously variable transmission as claimed in claim 1, further comprising:

an oil passage connected to the opening,
wherein the oil passage includes a tube having said opening on its leading end, and
wherein the tube is allowed to slide on the stabilizer in the running direction of the belt.

5. The lubrication device for a belt-driven continuously variable transmission as claimed in claim 1, further comprising:
an oil passage connected to the opening,
wherein the oil passage includes a tube having said opening on its leading end, and a feeding passage providing a connection between a hydraulic source and the tube, and
wherein one of leading ends of the feeding pipe is connected flexibly to the tube.

6. The lubrication device for a belt-driven continuously variable transmission as claimed in claim 1, further comprising:
an oil passage connected to the opening,
wherein the oil passage includes a tube having said opening on its leading end, and a feeding passage providing a connection between a hydraulic source and the tube, and
wherein one of leading ends of the feeding pipe is connected a casing while being allowed to rotate.

7. The lubrication device for a belt-driven continuously variable transmission as claimed in claim 1, wherein the stabilizer further comprises a pair of plate members being opposed to each other individually brought into contact to the belt running therebetween to suppress vibrations of the belt.

8. A lubrication device for a belt-driven continuously variable transmission having a pair of pulleys each of which is formed by a fixed sheave integrated with a rotary shaft and a movable sheave fitted onto the rotary shaft while being allowed to rotate integrally therewith and to reciprocate thereon, and a belt running between the pulleys to transmit torque therebetween, comprising:
a stabilizer that is brought into contact to a straight portion of the belt between the pulleys to suppress vibrations of the belt;
wherein the stabilizer comprises an opening oriented to a contact point between the sheave and the belt to apply oil to the contact point,
wherein the stabilizer is allowed to pivot and twist in response to a change in posture of the belt resulting from a speed change operation to keep the opening oriented to the contact point,
wherein the opening is formed on both ends of the stabilizer in a running direction of the belt, and
wherein one of the openings oriented to the contact point between the sheave and the belt entering into the pulley is diametrically larger than the other opening of the opposite side.

9. The lubrication device for a belt-driven continuously variable transmission as claimed in claim 8, further comprising:
a controller that controls a discharge amount of the oil from the opening;
wherein the belt includes a chain belt comprising a plurality of oval plate links arranged alternately to one another in a circular manner, and a plurality of pins individually inserted into each pin hole of the link to connect the adjoining links while allowing to pivot therearound; and
wherein the controller is configured to reduce the discharge amount of the oil from the opening with an increase in a slippage between the belt and the pulley.

10. The lubrication device for a belt-driven continuously variable transmission as claimed in claim 9, further comprising:
an oil passage connected to the opening; and
wherein the controller is further configured to reduce an oil delivery amount to the oil passage with an increase in a slippage between the belt and the pulley.

11. The lubrication device for a belt-driven continuously variable transmission as claimed in claim 8, further comprising:
an oil passage connected to the opening,
wherein the oil passage includes a tube having said opening on its leading end, and
wherein the tube is allowed to slide on the stabilizer in the running direction of the belt.

12. The lubrication device for a belt-driven continuously variable transmission as claimed in claim 8, further comprising:
an oil passage connected to the opening,
wherein the oil passage includes a tube having said opening on its leading end, and a feeding passage providing a connection between a hydraulic source and the tube, and
wherein one of leading ends of the feeding pipe is connected flexibly to the tube.

13. The lubrication device for a belt-driven continuously variable transmission as claimed in claim 8, further comprising:
an oil passage connected to the opening,
wherein the oil passage includes a tube having said opening on its leading end, and a feeding passage providing a connection between a hydraulic source and the tube, and
wherein one of leading ends of the feeding pipe is connected a casing while being allowed to rotate.

14. The lubrication device for a belt-driven continuously variable transmission as claimed in claim 8, wherein the stabilizer further comprises a pair of plate members being opposed to each other individually brought into contact to the belt running therebetween to suppress vibrations of the belt.

* * * * *